May 7, 1968    H. M. LEFEVER ETAL    3,381,559
INSPECTION DEVICE
Filed March 1, 1965    3 Sheets-Sheet 1
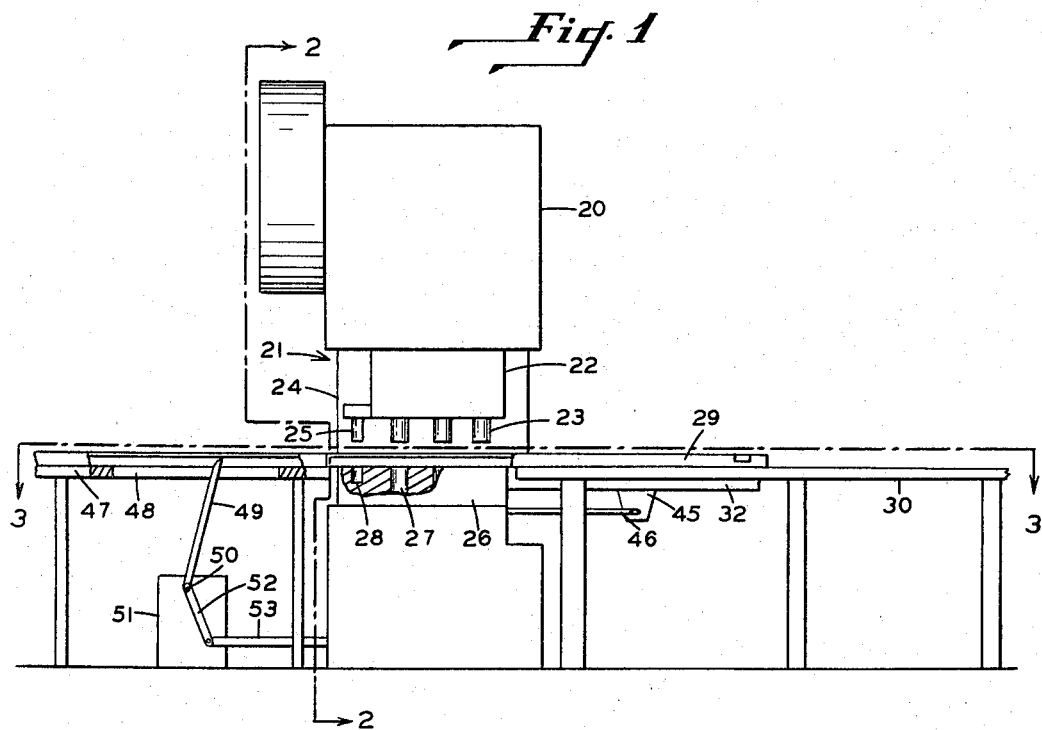
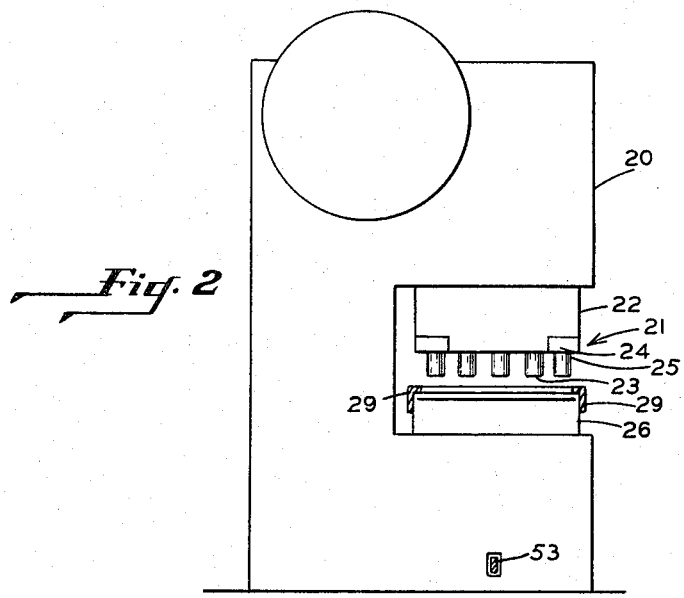
INVENTOR
HAROLD M. LEFEVER
FREDERICK W. SCHNEIDER
BY
ATTORNEY May 7, 1968     H. M. LEFEVER ETAL     3,381,559
INSPECTION DEVICE
Filed March 1, 1965     3 Sheets-Sheet 3
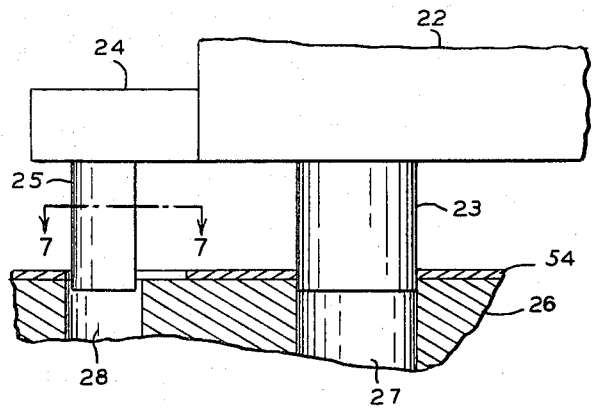
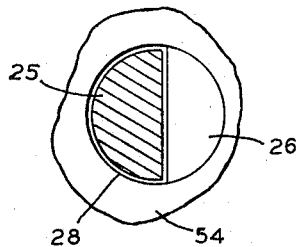
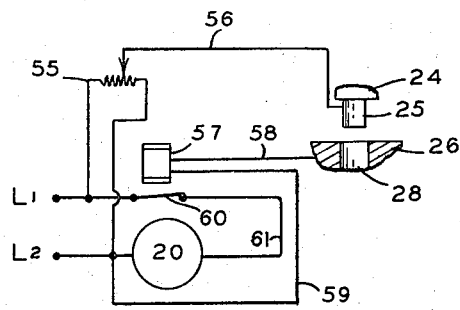
INVENTOR
HAROLD M. LEFEVER
FREDERICK W. SCHNEIDER
BY
ATTORNEY

United States Patent Office 3,381,559
Patented May 7, 1968

3,381,559
INSPECTION DEVICE
Harold M. Lefever and Frederick W. Schneider,
Lancaster County, Pa., assignors to Armstrong
Cork Company, Lancaster, Pa., a corporation of
Pennsylvania
Filed Mar. 1, 1965, Ser. No. 435,905
2 Claims. (Cl. 83—61)

ABSTRACT OF THE DISCLOSURE

Apparatus for the inspection of a punched sheet material. A gauge member with a dimension slightly less than the dimension of a hole to be gauged is inserted within the hole for inspection purposes. The gauge member and the sheet material operate as a switch for a defect sensing control. Lack of an opening in the sheet material or misalignment of the opening in the sheet material relative to the gauge means will permit the gauge means to contact the sheet material and close an electrically conductive circuit. The closed circuit then provides an indication that there is a defect in the punching or feeding operation preceding the inspection stage.

---

In material forming devices such as punch presses, for example, there arose a need for accurately inspecting the blanks from a sheet of material or the perforation in the sheet material after the blank has been punched therefrom. Since punch presses and other material forming apparatus are usually utilized in high speed production lines, any inspection apparatus associated with such material forming devices must also be high speed in operation.

An object of the present invention is to provide automatic inspection apparatus for material forming devices.

Another object of the present invention is to provide automatic inspection apparatus for material forming devices wherein the inspection apparatus includes feeler gauge means which may cooperate with a space remaining in a piece of material which has been formed.

Other objects of the present invention will be readily apparent from the detailed description thereof with reference to the drawings wherein FIGURE 1 is a view in elevation of material forming and handling apparatus incorporating an inspection device according to the present invention;

FIGURE 2 is a side view in elevation of a portion of the apparatus shown in FIGURE 1 taken along line 2—2 therein;

FIGURE 6 is an enlarged, partial view in elevation of an inspection device according to the present invention;

FIGURE 7 is a partial, sectional view of the inspection device shown in FIGURE 6 taken along line 7—7 therein; and FIGURE 8 is a circuit diagram which may be utilized with the inspection device and material forming apparatus shown in FIGURES 1 to 7.

Figure 3:
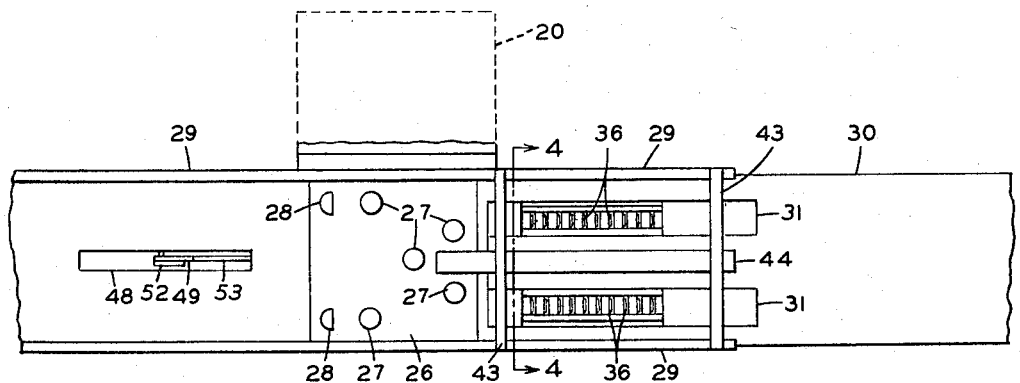
FIGURE 3 is a plan view of the apparatus shown in FIGURE 1 taken along line 3—3 therein.
Figure 4:
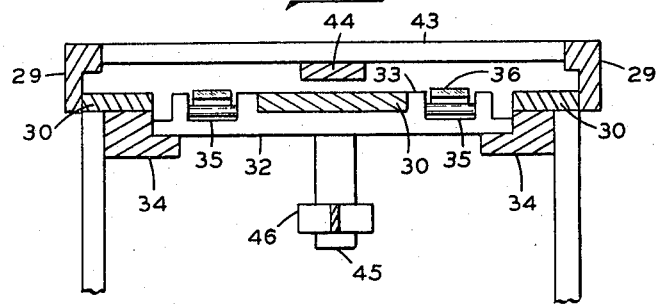
FIGURE 4 is a sectional view in elevation of the apparatus shown in FIGURE 3 taken along line 4—4 therein.

Referring now to FIGURES 1 to 3 there is shown material forming apparatus such as a conventional punch press 20, for example. Punch press 20 has a material receiving area 21 into which extends punch holder 22. A plurality of punches 23 depend from punch holder 22. Support plates 24 extend outwardly from the side of punch holder 22. A pair of feeler gauge fingers 25 are located in spaced relationship and depend from plates 24. Punch holder 22 is mounted for vertical reciprocation in press 20 through conventional support and drive means.

Die 26 is supported by the lower portion of punch press 20 and extends upwardly therefrom in underlying relationship to punch holder 22. Die 26 has a plurality of punch receiving bores 27, each of which underlies one of the punches 23. Die 26 also contains a pair of finger receiving bores 28 which underlie fingers 25. Bores 27 and 28 have configurations which are similar to those of punches 23 and fingers 25, respectively. Thus, during reciprocation of punch holder 22, punches 23 and fingers 25 will reciprocate into and out of their respective bores 27 and 28.

A pair of sheet material guide rails 29 extend through the material receiving area 21 on the either side of die 26. Guide rails 29 are supported at their central portions by die 26 and at their right ends by table 30 as viewed in FIGURE 1. Table 30 has a pair of spaced, longitudinal slots 31 extending toward die 26. A slide 32 has upwardly extending portions 33 which are received in slots 31. Slide 32 is supported in sliding relationship adjacent table 30 by means of angle supports 34.

Figure 5:
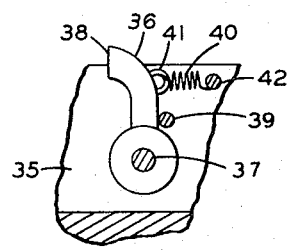
FIGURE 5 is an enlarged, partial view in elevation with portions broken away of the feed mechanism for the material forming apparatus shown in FIGURES 1 to 4.

Each of the upwardly extending portions 33 has a channel 35 which extends parallel to the slots 31. Each channel has a plurality of aligned lugs 36 each of which is mounted for rotation about a shaft 37. Each lug 36 has a material engaging surface 38 which faces die 26. A transverse stop 39 extends across channel 35 on the rear side of each lug 36 when it is in its upright position as shown in FIGURE 5. A spring 40 is secured at one end to eye 41 on lug 36 and at its other end to stationary rod 42 which extends across channel 35. Thus, spring 40 biases lug 36 into its upright position against stop 39. This arrangement will allow lug 36 to be moved in a counter-clockwise direction about its shaft 37 against the bias of spring 40 in response to an external force.

A pair of cross supports 43 are supported by guide rail 29. A longitudinal hold-down block 44 depends from cross supports 43 over the central portion of table 30 in parallel relationship with guide rails 29.

Depending from slide 32 is member 45 which is secured by means of link 46 and other conventional mechanism to the drive means of the punch press 20. This drive arrangement may be adjusted to reciprocate slide 32 through a desired length of stroke within the limits imposed by the length of slots 31.

As shown in FIGURE 1, rails 29 extend beyond the left side of punch press 20 and are supported by table 47 which has a central slot 48. A finger 49 is supported by shaft 50 which is mounted on support 51. Finger 49 is supported for oscillation about shaft 50 and has a downwardly extending link 52 rigidly secured therewith. The free end of link 52 is pivotally connected to link 53 which is in turn connected to the punch press drive mechanism. This drive mechanism is adjustable to allow oscillation of finger 49 about shaft 50 which moves the upper portion of finger 49 through and out of slot 48.

In operation, sheets of material which are to be punched may be supplied across table 30 to slide 32 which may be so adjusted that the rear-most lugs 36 in channels 35 will engage the rear edge of the sheet 54 as it is guided through rails 29. The central portion of one of the guide rails 29 may be movably mounted and spring biased into engagement with the side of the sheet 54 for alignment purposes, if desired. It is to be understood that cross supports 43 and block 44 may be adjustably arranged with respect to guide rails 29 such that the space between the lower surface of block 44 and the upper surface of the central portion of table 30 will allow a sheet of material 54 passing therebetween to be held in engagement with block 44 as a result of the upward force exerted by each spring biased lug 36 against the sheet 54 as it overlies such a lug in passing over table 30. For this purpose, each cross support 43 may contain conventional thumb screw means, not shown, which may operate against guide rails 29 to raise or lower each support 43 and block 44 with respect to table 30. In any event, when a sheet of material 54 is initially engaged by the rear-most lugs 36, slide 32 will be located in a position toward the right-hand ends of slots 31. The drive mechanism of punch press 20 and associated linkage including link 46 are operated so that the first portion of sheet 54 will underlie the first pair of punches 27. At this point further movement of slide 32 is terminated while punch holder 22 is moved downwardly to cause punches 23 in cooperation with bores 27 to blank out portions of sheet 54. The punch holder 22 and punches 23 are then retracted and slide 32 is caused to move forward until the initial portion of sheet 54 underlies the next punch 23 at which time movement of slide 32 is terminated and punch holder and punches 23 are again reciprocated to repeat the punching or blanking operation. When this cycle has been completed the sheet 54 is again indexed or moved forward by slide 32 until it underlies the last set of punches 23 at which time the movement of the slide 32 is terminated and the punch holder moves downwardly with its associated punches to blank or punch out portions of sheet 54. The punched out portions of the sheet may pass downwardly through bores 27 to suitable collecting means in punch press 20 which are not shown herein. It is apparent that between each downward stroke of punch holder 22 sheet 54 is indexed a predetermined amount in the conventional manner in preparation for subsequent punching operations wherein additional portions will be blanked or punched from the sheet as is well known in the art. This intermittent movement of slide 32 may continue until said slide 32 approaches the left-hand ends of slots 31 at which time slide 32 may be retracted. During retraction of slide 32 the lugs 36 which were underneath sheet 54 in a depressed condition in channel 35 will be drawn into their upright positions by springs 40 as soon as said lugs 36 clear the rear end of sheet 54 which is frictionally held against rearward movement by lugs 36 acting on said sheet 54 to hold it against block 44. This will continue until the slide 32 reaches the right-hand end of its stroke as viewed in FIGURE 3 at which time the forward movement of said slide 32 again may be initiated. It is apparent that forward movement of slide 32 will cause the material engaging surfaces 38 of the lugs adjacent the end of the sheet to contact the rear edge of said sheet 54 and move it forward in the intermittent manner noted heretofore. It is to be understood that the length of stroke may be varied in a well known manner. For example, the length of stroke may be only enough to index the sheet of material 54 from one punch to the next after which the slide 32 would be retracted for the next move. The number of moves accomplished during each forward stroke of the slide 32 may be adjusted by the operator of the machine in accordance with his requirements.

As shown in FIGURES 1, 3, 6 and 7, the feeler gauge fingers 25 are longitudinally aligned with the last pair of punches 23 as the sheet material 54 passes through press 20. Each finger 25 and its associated bore 28 is spaced from the preceding punch 23 a distance equal to the proper length of move of the sheet material during each indexing operation. Each finger 25 has a periphery which is less than that of the periphery of its associated bore 28 and of the hole remaining in the sheet 54 after it has been punched. The clearance between these elements may be on the order of .015", for example. Thus, during the downstroke of the punch holder 22, the finger 25 will enter its associated bore 28 without touching the sheet 54 or any portion of the bore 28 if the sheet 54 has been properly indexed and aligned with respect to the punch holder 22 and guide rails 29 as shown in FIGURE 6, for example. Further, the periphery of the finger 25 will not contact any portion of the sheet material 54 or bore 28 if the aligned punch 23 has properly performed its punching function. Thus, by providing the finger 25 with a configuration which is substantially the same but slightly less than the punch with which it is aligned, the quality of the blanked out portion of the sheet 54 as well as the space or hole remaining in the sheet 54 subsequent to the punching operation may be readily determined. The finger 25 operates as an inspection gauge as well as detecting improperly indexed or aligned sheet material 54.

As shown in FIGURE 8, lines L1 and L2 may be connected to a suitable source of power. A voltage divider 55 or other source of low voltage may be connected across lines L1 and L2. A conductor 56 may connect finger 25 to voltage divider 55. Finger 25 is electrically insulated from plate 24 and the rest of press 20. Guide 26 is electrically connected to relay 56 through conductor 58. Conductor 59 connects relay 57 to line L2. Relay 57 actuates switch 60 located in line L1. Conductor 61 connects switch 60 to the drive motor of punch press 20 which is also connected to L2 to form a complete circuit. Thus it is apparent that a low voltage may be created between finger 25 and die 26. It is noted that when relay 57 is unenergized, switch 60 is normally closed thereby completing a circuit to the drive motor of punch press 20 allowing operation thereof. However, it is apparent that if a piece of metal sheet material 54 were misaligned with respect to feeler finger 25 and its associated bore 28, descent of said finger 25 during the downstroke of punch holder 22 would cause contact between said finger and the metal sheet 54 and die 26 thereby completing a circuit through conductor 58, relay 57 and conductor 59 to line L2. Completion of this circuit energizes relay 57 which opens switch 60 thereby terminating operation of the drive motor of punch press 20. Therefore, it is apparent when finger 25 contacts a metallic piece of sheet material 54 thereby completing the aforementioned circuit, an improper condition of the sheet material in the press is indicated, and the press is immediately shut down thereby avoiding undue scrap or damage to the machine due to improperly punched or aligned sheet material.

If the sheet material has been punched properly, the fingers 25 will pass through sheet 54 and die 26 without making contact therewith or completing the circuit described above and shown in FIGURE 8 to terminate operation of the machine. Thus, the machine will continue to operate in a normal manner, and the sheet material 54 will be progressively passed through the punching operation until such time as the foremost portion of the now-perforated sheet overlies slot 48. Finger 49 is so adjusted in its oscillation that it will pass upwardly from a point beneath table 47 through slot 48 into engagement with a space or perforate area in the now-punched sheet material 54. The oscillation of finger 49 is controlled so that the sheet material 54 is intermittently pulled through the remainder of the punching operation. The sheet may then be removed from table 47 to an appropriate storage or scrap area. It will be apparent that the feeding mechanism of the punch press described above will allow sheets of material to be successively passed through the punching operation.

It is apparent that the inspection or feeler gauge fingers of the present invention provide a relatively uncomplex but reliable inspection means whereby improperly punched or indexed material will be immediately detected thereby preventing undue waste of sheet material as well as damage to the machine. Once the operation of the machine is terminated in response to such an improper condition, the operator may quickly rectify the improper condition and place the machine back into operation with a minimum amount of downtime.

It is to be noted that one or more fingers may be used on any given press and said finger or fingers may be aligned with any one punch or set of punches in that particular press. However, it was found that the spaced relationship as shown in the drawings provided good results from an inspection standpoint. The configuration of the fingers and/or their associated bores and the clearance therebetween may be varied depending upon the inspection requirements. It is to be understood that the apparatus shown and described herein may be sectionalized and secured together by conventional fastening means for assembly and disassembly purposes as would be obvious to a skilled mechanic. The inspection feeler apparatus of the present invention may be electrically or otherwise connected to signal means other than those described above. For example, instead of or in addition to terminating operation of the machine, the feeler finger circuit may be connected to indicator lights. The device of the present invention is not limited to the particular embodiment shown and described herein. The number, size, shape, composition, relative location, and materials of construction of the device of the present invention may be varied. The inspection device of the present invention may be used on any type of punch press and on material forming devices other than punch presses.

Various modifications to the present invention will occur to those skilled in the art without departing from the spirit and scope thereof as defined in the claims.

We claim:

1. In combination, a punch press having a punch holder, a punch mounted on said punch holder, a co-operating die, means to cause relative movement of said punch and die into and out of blanking relationship, means to position successive portions of electrically conductive sheet material between said punching die during relative movement thereof whereby a blank will be removed from said sheet material leaving a space therein after each period of relative movement between said punch and said die, and inspection means to sense a space which is improperly located with respect to said sheet material and said press, said inspection means comprising a gauge means which is aligned with and movable into a corresponding gauge-receiving recess in the die, said gauge means having a periphery which is less than the periphery of the space in the sheet material, a defect sensing means comprising an electrical circuit, said circuit extending between the gauge means, a power source and the die which is in contact with the sheet material, said gauge means and said sheet material forming a switch means which is opened when the gauge means and sheet material will not contact each other and which is closed to operate the defect sensing means when the gauge means and sheet material contact each other so that a space in the sheet material which is properly cut and positioned with respect to the gauge means will not be contacted by the gauge means as it passes through the space, but an uncut area, an improperly cut space or a mispositioned space will cause contact between the gauge means and sheet material to operate the defect sensing means.

2. The combination of claim 1 wherein the defect sensing means shuts off the drive for the punch press.

References Cited

UNITED STATES PATENTS

| | | | |
|---|---|---|---|
| 1,447,381 | 3/1923 | Graham | 83—61 |
| 1,717,426 | 6/1929 | Weaver | 83—61 |
| 1,819,431 | 8/1931 | McDonald | 83—278 X |
| 2,083,312 | 6/1937 | Brown et al. | |
| 2,942,729 | 6/1960 | Bowen. | |
| 3,160,045 | 12/1964 | Newgard | 83—63 |

JAMES M. MEISTER, *Primary Examiner.*

WILLIAM W. DYER, JR., *Examiner.*